United States Patent [19]

Markwitz et al.

[11] Patent Number: 4,627,074
[45] Date of Patent: Dec. 2, 1986

[54] METHOD AND ARRANGEMENT FOR TRANSMITTING CHARACTERS

[75] Inventors: Wernhard Markwitz, Munich; Edward Kaeser, Olching, both of Fed. Rep. of Germany

[73] Assignee: Siemens Aktiengesellschaft, Berlin & Munich, Fed. Rep. of Germany

[21] Appl. No.: 449,146

[22] Filed: Dec. 13, 1982

[30] Foreign Application Priority Data

Feb. 26, 1982 [DE] Fed. Rep. of Germany ....... 3207040

[51] Int. Cl.$^4$ .............................................. H04L 9/02
[52] U.S. Cl. ................................. 375/2.1; 178/22.03
[58] Field of Search ..................... 375/2.1; 179/22.02, 179/22.13, 1.5 R

[56] References Cited

U.S. PATENT DOCUMENTS

| | | | |
|---|---|---|---|
| 3,773,977 | 11/1973 | Guawella | 179/1.5 R |
| 3,878,332 | 4/1975 | Morgan et al. | 178/22.13 |
| 3,921,151 | 11/1975 | Guawella | 179/1.5 R |
| 3,970,790 | 6/1976 | Guawella | 179/1.5 R |
| 4,208,545 | 6/1980 | Zenner | 178/22.02 |
| 4,262,359 | 4/1981 | Cory et al. | 375/2.1 |
| 4,329,545 | 5/1982 | Westermayer | 178/22.03 |
| 4,369,333 | 1/1983 | Gemperle et al. | 178/22.13 |

FOREIGN PATENT DOCUMENTS 1200868 9/1965 Fed. Rep. of Germany .
2553897 1/1979 Fed. Rep. of Germany .

Primary Examiner—Salvatore Cangialosi
Attorney, Agent, or Firm—Hill, Van Santen, Steadman & Simpson

[57] ABSTRACT

In order to prevent bit combinations which are assigned to specific control characters from arising when ciphering characters, transmittable characters which consist of a part of the ciphered character and fill characters are generated from the ciphered characters. When the ciphered characters respectively consists of m binary characters, respectively small n binary characters from a sequence of ciphered characters are provided with $(m-n)$ fill characters and combined to form the transmittable characters. The binary values of the fill characters are selected in such a manner that no undesired control characters occur within the transmittable characters and given specific sequence of transmittable characters.

12 Claims, 4 Drawing Figures

METHOD AND ARRANGEMENT FOR TRANSMITTING CHARACTERS

BACKGROUND OF THE INVENTION

1. Field of the Invention

The present invention relates to a method and to an arrangement for transmitting characters from a transmitting station to a receiving station in which the characters are emitted by a data source and are ciphered in a transmitting station and the ciphered characters are deciphered in a receiving station and output to a data sink and wherein the ciphered characters have a first plurality m of binary characters. More specifically, in the transmitting station a respective second plurality n of binary characters of successive, ciphered characters is provided with a prescribed plurality of binary fill characters, the number n being smaller than the number m of binary characters.

2. Description of the Prior Art

When characters encoded in accordance with an internationally-predetermined code are ciphered in a transmitting station, are transmitted to a receiving station, and are deciphered in the receiving station, binary combinations can occur as ciphered characters which denote control characters in accordance with the code of the unciphered characters. These control characters are, for example, the characters for "carriage return", "new line", "letters", "numerals", "space" or the character which only contains the binary characters zero. When the ciphered characters are transmitted and deciphered in the receiving station, then the randomly-occurring control characters do not have a disruptive effect because the originally-existing characters reoccur in the course of the deciphering instead of the randomly-occurring control characters. In some instances, however, it is desirable to record the ciphered characters, for example, to output the same with the assistance of a printer. This, however, is not possible because the printer responds to the randomly-occurring control characters. When, for example, a ciphered character occurs which corresponds to the control character "carriage return", then the printer recognizes the control character and the triggered carriage return is undertaken at a point in the text which is generally entirely unsuitable.

Declared sequences of alphanumerical characters are likewise true as control characters in some procedures for the transmission of characters. This is particularly the case when the characters are transmitted either unciphered, or ciphered, over a transmission link and sequences of characters are then transmitted as control characters, the occurrences of the sequences in a normal text being extremely improbable. Such control characters are formed, for example, by four successive letters M or S. The occurrence of such control characters in a ciphered text is likewise undesired since, for example, a switching center located in the transmission link prematurely disconnects the connection, or initiates other undesired control operations.

It is known from the German Letters Patent No. 25 53 897, fully incorporated herein by this reference, to only cipher the alphanumerical characters and to transmit the control characters unciphered to the receiving station. The occurrence of individual, ciphered characters whose bit combinations represent a control character is thereby advantageously prevented by a corresponding reduction in the supply of ciphered characters. By so doing, it is guaranteed that the ciphered text is represented in accordance with the input text given the operating mode initially mentioned in which the ciphered text is printed at the receiving station. The occurrence of the last-cited control characters, consisting of a plurality of letters, within the ciphered characters, however, cannot be prevented with this known method.

SUMMARY OF THE INVENTION

It is therefore the object of the invention to provide a method and an arrangement for the formation of control characters by way of the ciphered characters is prevented.

Given the general method set forth above, the above object is achieved according to the present invention, wherein the ciphered characters comprise a first plurality m of binary characters, in that, in a transmitting station, a respective second plurality n of binary characters of successively ciphered characters is provided with a predetermined plurality of binary fill characters, where the number n is smaller than the number m, and the characters are combined into a respective character for transmission to a receiving station. In the receiving station, the fill characters are removed from the transmitted characters and the first respective plurality m of binary characters from the remaining binary characters are combined into a character assigned to the original, ciphered character and are then deciphered.

The method of the present invention has the advantage that it functions with high security since ciphered characters are prevented from being interpreted as control characters and not output at the receiving side in the form of alphanumerical characters. A further improvement of the transmission reliability is achieved in that the fill characters are employed for error protection.

The present method is advantageously employed given transmission of characters which have the format of telegraph characters and are coded by way of five information-carrying binary characters in accordance with the International Telegraph Alphabet Number 2. In this case, four respective binary characters are provided with a binary fill character and are transmitted as transmittable characters from the transmitting station to the receiving station. In case the characters are coded by way of eight respective binary characters, seven binary characters can be provided with a fill character in a corresponding manner and can be subsequently declared as characters to be transmitted. In this instance, the possibility also exists of providing four respective binary characters with a fill character and to transmit the characters generated in this manner over a transmission link which is provided for the transmission of telegraph characters having, respectively, five binary characters.

The definition of the binary value of the fill characters can occur in that the fill character alternately assumes the binary value "0" or "1" and/or in that, given occurrence of control characters which are formed of one character, one of the binary characters is inverted as a fill character. Given a transmission of the ciphered characters in the form of telegraph characters, the first or the last binary character is advantageously employed as a fill character.

An advantageous development of an arrangement for executing the method is characterized in that a first converter is provided which converts the ciphered characters into the transmittable characters following a crypto-computer ciphering in the transmitting station and in that a second converter is provided which reconverts the transmittable characters into the ciphered characters and feeds the ciphered characters to a crypto-computer to decipher the same at the receiving station. The conversion can occur in that a respective, given plurality of ciphered or, respectively, transmittable characters are stored in a shift register and are output over a further shift register employing a multiplexer for the insertion or, respectively, removal of the fill characters. Of course, it is also possible to execute the conversion with the use of a microcomputer.

BRIEF DESCRIPTION OF THE DRAWINGS

Other objects, features and advantages of the invention, its organization, construction and mode of operation will be best understood from the following detailed description thereof, taken in conjunction with the accompanying drawings, on which.

DESCRIPTION OF THE PREFERRED EMBODIMENTS

Figure 1:
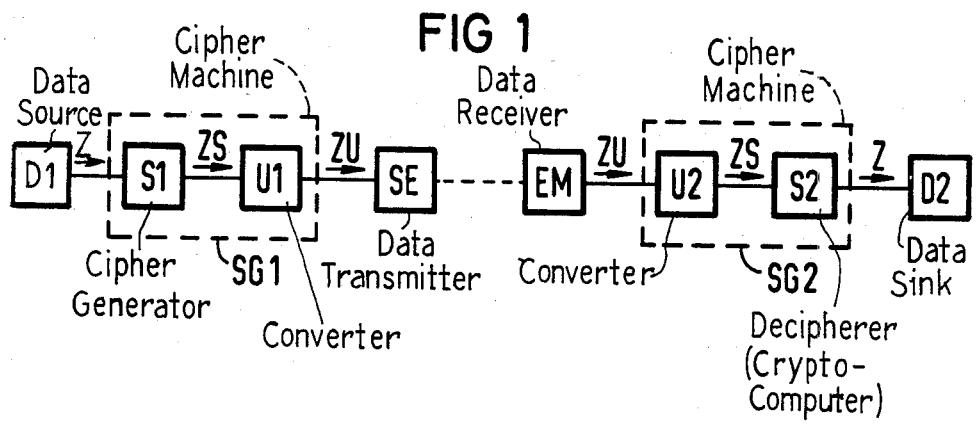
FIG. 1 is a schematic block diagram of an arrangement for ciphering, transmitting and deciphering characters.

FIG. 1 illustrate, at a transmitting side, a data source D1, a cipher machine SG1, and a data transmitter SE. At the receiving side, the system comprises a data receiver EM, a second cipher machine SG2 and a data sink D2. The cipher machine SG1 comprises a cipher generator S1 which enciphers the character Z emitted by the data source D1 and supplies ciphered characters ZS. The ciphered characters ZS supplied to a converter U1 which prevents the occurrence of control characters within the ciphered characters and emits transmittable characters ZU to the data transmitter SE. After transmission of the transmittable character ZU, the same are received by the data receiver EM which feeds the cipher machine SG2. The cipher machine SG2 comprises a converter U2 which regains the ciphered characters ZS from the transmittable characters ZU. A cryptocomputer S2 then regenerates the original characters Z from the ciphered characters ZS and supplies the same to the data sink D2.

Figure 2:
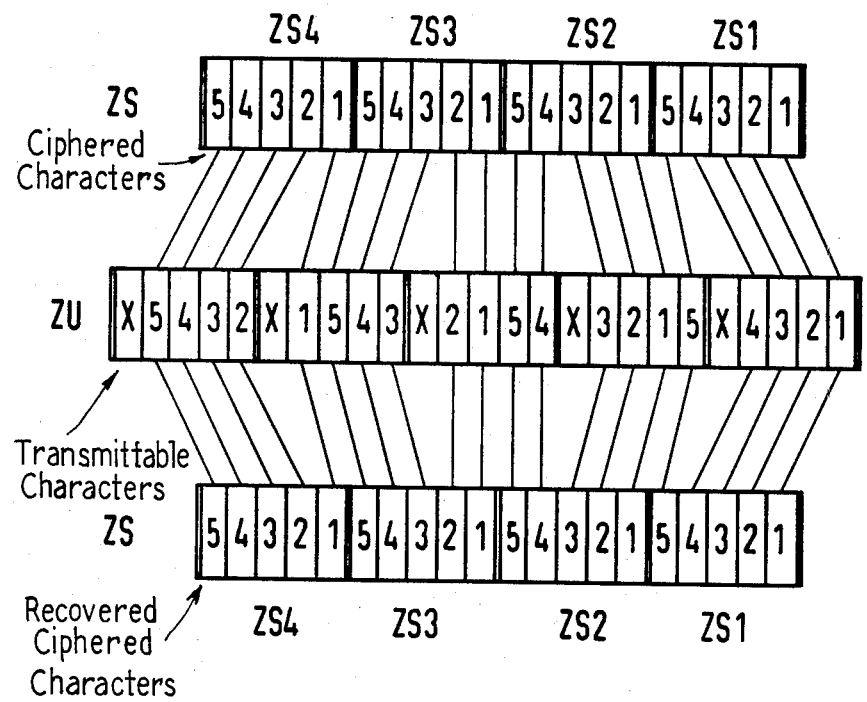
FIG. 2 is a schematic illustration of a conversion and a recovery of ciphered characters.

The conversion processes in the two converters U1 and U2 are schematically illustrated in FIG. 2. Conversion occurs on the assumption that the characters Z and the ciphered characters ZS are coded in accordance with the International Telegraph Code Number 2 and respectively exhibit five information-carrying binary characters. Start and stop characters which may exist are not taken into consideration here since they are of no significance for the conversion process. In the conversion, four respective binary characters of the ciphered character ZS are provided with a full character X and are combined into a new transmittable character ZU which can be provided with a start step and with a stop step and which can be transmitted from the transmitting station to the receiving station. The fill character X is preferably located in place of the first or fifth binary character in the telegraph character. When the coding of the ciphered character ZS corresponds to alphanumerical characters, the binary values of the fill characters X are changed from character-to-character and, therefore, alternately assume the binary values "0" and "1". By so doing, the creation of control characters which are formed of a plurality of identical alphanumerical characters is prevented.

When the coding of a transmittable character ZU generated in this manner would already correspond to a control character per se, the binary value of the fill character is inverted.

Although 25% more characters are to be transmitted given a message due to the introduction of the fill characters X in the illustrated example, high security against miscontrols on the transmission links is provided given the use of declared procedures and given recording of the ciphered characters at, for example, a printer. Moreover, the fill characters x can be employed for error protection.

At the receiving side, the fill characters X are removed from the incoming, transmittable characters ZU and respectively five of the remaining binary characters are combined into a characters are combined into a character when then again represents the ciphered character ZS and is supplied to the crypto-computer S2.

Given coding of the ciphered characters ZS with eight binary characters, seven or less characters can be combined in an entirely analogous manner, can be provided with one or more fill characters X, and can be again output with eight binary characters as transmittable charactes ZU. It is also possible to divide the ciphered characters ZS each having eight binary characters into two or more telegraph characters each having five binary characters and, for example, four respective binary characters are provided with a fill character X and are output as a telegraph character.

Figure 3:
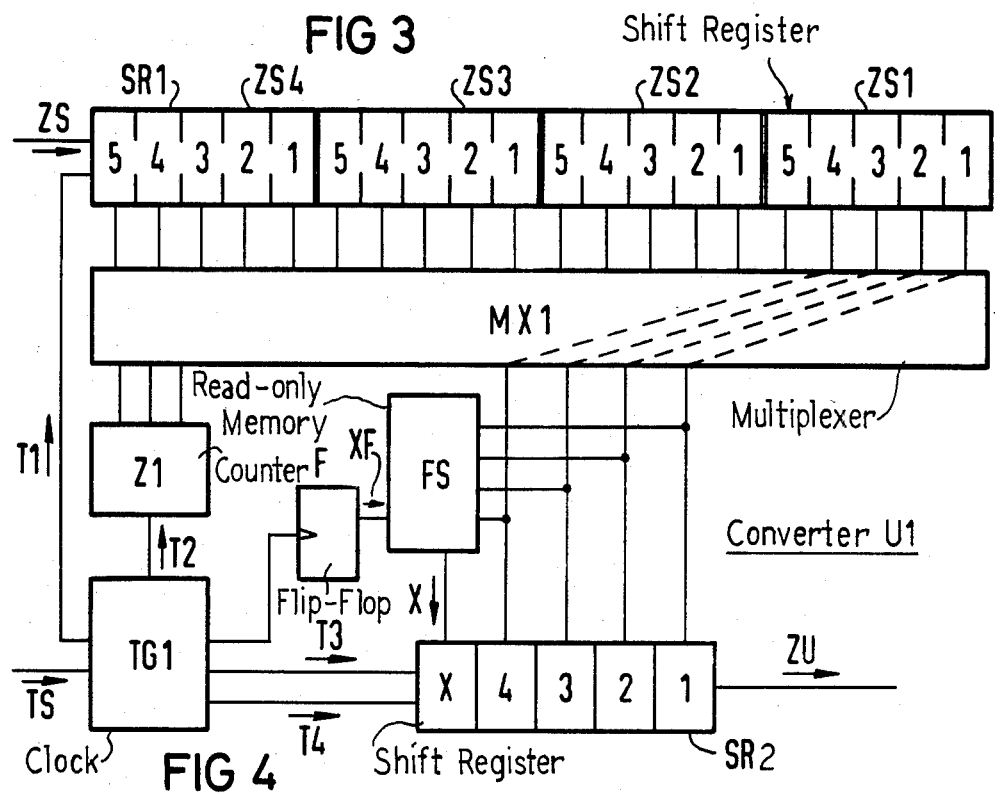
FIG. 3 is a schematic block representation of an arrangement for converting the ciphered characters into transmittable characters.

Referring now to FIG. 3, a block diagram of the converter U1 is illustrated as comprising a first shift register SR1 to which four ciphered characters ZS are supplied from the crypto-computer S1. After, for example, initiation on the basis of a respective clock signal TS assigned to a ciphered character ZS and output by the crypto-computer S1, a clock generator TG1 supplies clock pulses T1 which serially step the ciphered characters ZS into the shift register SR1. A multiplexer MX1, which includes four outputs, and which switches these outputs to, respectively, four inputs in chronological succession, is connected to the parallel outputs of the shift register SR1. The transfer is controlled by a counter Z1 which receives clock pulses T2 from the clock generator TG1 after the occurrence of the clock pulses T1. In the initial position, the first four binary characters of the ciphered character ZS1 are through-connected over the multiplexer MX1 to a second shift register SR2.

A read-only memory FS checks the binary values of the binary characters, additionally, the binary value of a signal XF emitted by a flip-flop F. When the combination of these binary characters and of the signal XF emitted by the flip-flop F corresponds to a single control character, the read-only memory FS emits a fill character X to the shift register SR2, the fill character X corresponding to the inverted signal XF. In all other instances, the signal XF is through-connected to the shift register SR2 as the fill character X. Subsequently, the clock generator TG1 generates a clock pulse T3 which transfers the applied binary values of the binary characters and of the fill character X into the shift register SR2. Then, the clock pulse generator TG1 generates clock pulses T4 which serially read out the shift register SR2 and emit the first transmittable character ZU at the output of the shift register SR2.

Subsequently, a clock pulse T2 is again generated and the multiplexer M1 through-connects the next four binary characters, i.e. the fifth binary character of the ciphered character ZS1 and the first three binary characters of the ciphered character ZS2, to the shift register SR2. The read-only memory FS again generates a corresponding fill character X and, subsequently, the next transmittable character ZU is emitted. This operation is repeated until all binary characters in the shift register SR1 have been processed. Subsequently, the next four ciphered characters ZS are read into the shift register SR1 and the entire process is repeated.

Figure 4:
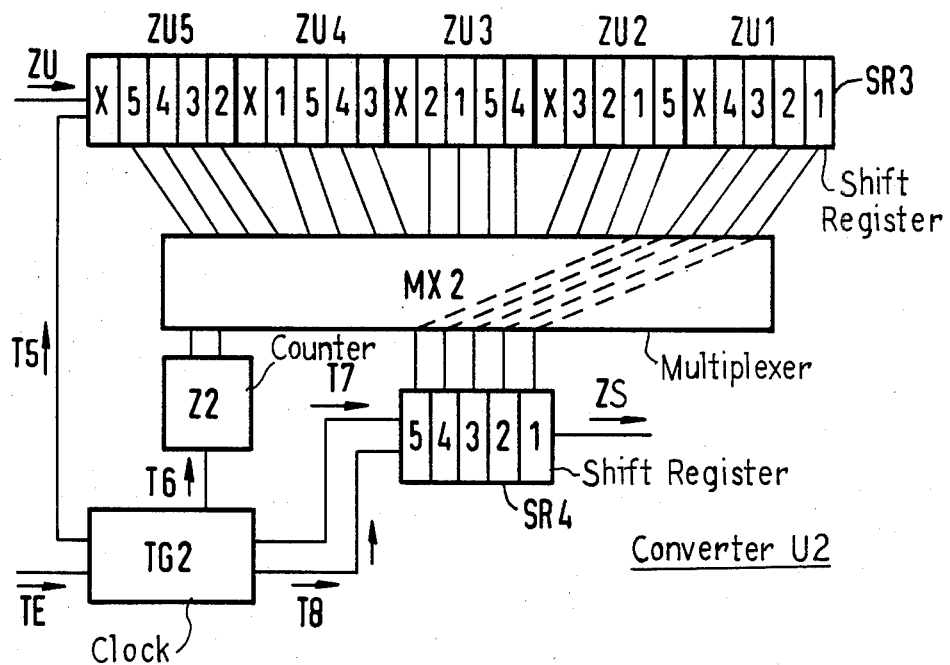
FIG. 4 is a schematic block diagram of an arrangement for recovering the ciphered characters from the transmittable characters.

Referring now to FIG. 4, the converter U2 of the receiving station is illustrated. The transmittable characters ZU proceed from the data receiver EM to a first shift register SR3. The shift register SR3 accepts five respective characters ZU1 through ZU5. The step-in occurs in that a clock generator TG2 receives a clock signal TE from the data receiver EM at each character ZU and then generates clock pulses T5 which are applied to step the character ZU into the shift register SR3. Those stages of the shift register SR3 which contain binary characters, i.e. not those stages which contain a fill character X, are connected to the inputs of a multiplexer MX2. The multiplexer MX2 has five outputs and switches these outputs to five respective inputs. This transfer also occurs by way of a counter Z2 which is driven by clock pulses T6.

In its initial position, the multiplexer MX2 connects the first four binary characters of the character ZU1 and the first binary character of the character ZU2 through to its output. When the clock generator TG2 generates a clock pulse T7, these binary characters are input in parallel into a second shift register SR4. The binary characters which are now stored in the shift register SR4 correspond to the binary characters of the ciphered character ZS1. Subsequently, the clock generator TG2 generates clock pulses T8 with which the shift register SR4 is serially read so that the ciphered character ZS1 is emitted at its output. Subsequently, a clock pulse T6 is again generated and the multiplexer MX2 connects the next five inputs to its outputs so that the ciphered character ZS2 is transferred into the shift register SR4 and is subsequently output. This operation is repeated until all binary characters of the characters ZU1 through ZU5 have been processed. Then, the next characters ZU are read into the shift register SR3 and the overall process is repeated.

Since, in the conversion in the converter U1, five transmittable characters ZU are generated from four respective ciphered characters ZS, a buffered memory is necessary in the transmitting station. In addition, it is advantageous to inhibit the input of the characters Z under certain conditions when sufficient previously-input characters Z have not yet been processed. In an analogous manner, a buffer memory is also required in the receiving station because, given the illustrated exemplary embodiment, five respective characters ZU1 through ZU5 are combined before the conversion into the ciphered character ZS occurs. The converters U1 and U2, of course, can also be designed as microcomputers which execute the conversion on a program-controlled basis.

Although we have described our invention by reference to particular illustrative embodiments thereof, many changes and modifications of the invention may become apparent to those skilled in the art without departing from the spirit and scope of the invention. We therefore intend to include within the patent warranted hereon all such changes and modifications as may reasonably and properly be included within the scope of our contribution to the art.

We claim:

1. In a method of transmitting characters from a transmitting station to a receiving station, in which the characters emitted by a data source are ciphered in the transmitting station to comprise a plurality m of binary characters, and in which the ciphered characters are deciphered in the receiving station and fed to a data sink, the improvement therein comprising the steps of:

in the transmitting station, combining a plurality n of the binary characters of ciphered characters and a plurality x of fill characters whose binary values are respectively selected such that no control characters appear given a sequence of transmittable characters which represent letters, each control character being represented by a plurality of transmittable characters, to form transmittable characters, where the number n is less than the number m;

in the receiving station, removing the inserted fill characters; and combining the respective plurality m of binary from the remaining characters to form characters representing the original ciphered characters for deciphering.

2. The method of claim 1, comprising the step of:
generating the fill characters to alternately have the first binary value and the second binary value in successive transmittable characters.

3. The method of claim 2, and further compribising the step of:
in response to the appearance of a sequence of transmittable characters which is assigned to a single control character, inverting the binary values of the fill characters in the transmittable characters.

4. The method of claim 1, comprising the further steps of:
selecting the plurality m to be five binary characters;
selecting the plurality n to be four binary characters; and
selecting the plurality x of fill characters to be one binary character so that the transmittable character comprises five binary characters.

5. The improved method of claim 1, comprising the steps of:
selecting the plurality m to be eight binary characters for a ciphered character; and
selecting the plurality n of four binary characters; and
selecting the number of fill characters to be on binary character.

6. The method of claim 1, comprising the further steps of:
selecting the plurality m to be eight bihary characters;
selecting the plurality n to be seven binary characters; and
selecting the number x to be one binary character.

7. Apparatus for transmitting data from a data source which emits serial data words to a data sink which utilizes the data words, comprising:
   a first cipher machine connected to the data source and operable to produce transmittable data words in response to data source words, including a ciphered generator operable to produce a sequence of ciphered words each having a plurality n of bits and a first converter for replacing a different bit in each word with a fill bit so that no control characters appear in a sequence of characters to be transmitted; each control character being represented by a plurality of character to be transmitted,
   a data transmitter connected to said first cipher machine for transmitting the transmittable words, and a data receiver for receiving the transmitted words; and
   a second cipher machine connected between said data receiver and the data sink and operable to recreate the data words of the data source from the received words, including a second converter connected to said data receiver and operable to separate the fill bits and generate characters representing the ciphered words which respectively have m bits.

8. The apparatus of claim 7, wherein:
   said first converter comprises a microcomputer.

9. The apparatus of claim 7, wherein
   said second converter comprises a microcomputer.

10. The apparatus of claim 7, wherein said first converter comprises:
    a first shift register including an input for serially receiving a sequence of ciphered data words, and a plurality of outputs;
    a second shaft register including a plurality of parallel inputs and a serial output connected to said data transmitter;
    a multiplexer connected between those of said parallel outputs not corresponding to a fill bit and some of said parallel inputs and operable to sequentially through-connect the same;
    fill character means operable to produce fill characters;
    insertion means connected to said plurality of inputs, to said fill character means, and to at least one of said parallel inputs and operable to selectively produce a fill character in response to said fill character means and the bits applied to said some parallel inputs; and
    clock means connected to said first and second shift registers, to said multiplexer and to said fill character means and operable to sequentially control the operating sequences thereof.

11. The apparatus of claim 10, wherein said fill character means comprises:
    a flip-flop connected to and operated by said clock means.

12. The apparatus of claim 11, wherein said insertion means comprises:
    a read-only memory connected to said outputs of said multiplexer and to said flip-flop, said memory storing control characters which are not to be transmitted and operable in response to detection of a control character to insert the output of said flip-flop, inverted, as a fill character and operable to insert the output of said flip-flop, uninverted, in response to the lack of detection of a control character.

* * * * *